(12) United States Patent
Takeda

(10) Patent No.: US 8,493,637 B2
(45) Date of Patent: Jul. 23, 2013

(54) IMAGE FORMING OPTICAL ELEMENT, IMAGE FORMING OPTICAL ARRAY, AND IMAGE READING DEVICE

(75) Inventor: Takashi Takeda, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 44 days.

(21) Appl. No.: 13/353,665

(22) Filed: Jan. 19, 2012

(65) Prior Publication Data
US 2012/0188613 A1 Jul. 26, 2012

(30) Foreign Application Priority Data

Jan. 21, 2011 (JP) ................................. 2011-010746
Jan. 21, 2011 (JP) ................................. 2011-010747

(51) Int. Cl.
*H04N 1/04* (2006.01)
(52) U.S. Cl.
USPC ............ 358/474; 358/457; 358/509; 359/726
(58) Field of Classification Search
USPC .................. 358/474, 475, 509, 505; 359/726, 359/727, 627
See application file for complete search history.

(56) References Cited

U.S. PATENT DOCUMENTS

| 6,724,503 | B1 * | 4/2004 | Sako et al. ..................... 358/483 |
| 6,767,122 | B2 * | 7/2004 | Honguh et al. ................ 362/555 |
| 7,085,023 | B2 * | 8/2006 | Okamoto et al. ............. 358/471 |
| 7,423,784 | B2 * | 9/2008 | Tanabe et al. ................. 358/461 |
| 7,812,304 | B2 * | 10/2010 | Ikeda et al. ............. 250/227.21 |
| 7,843,612 | B2 * | 11/2010 | Kimura et al. ................ 358/474 |
| 7,969,622 | B2 * | 6/2011 | Saika ............................ 358/475 |
| 8,049,937 | B2 * | 11/2011 | Saito ............................ 358/474 |
| 8,228,567 | B2 * | 7/2012 | Kim .............................. 358/475 |

FOREIGN PATENT DOCUMENTS

JP 2000-066134 A 3/2000

* cited by examiner

*Primary Examiner* — Negussie Worku

(57) ABSTRACT

An image forming optical element is provided, in which a first lens, a second lens, and a light guiding unit that leads the light input from the first lens, to the second lens, the light guiding unit has a curved shape of a first curve portion and a second curve portion from the first lens to the second lens, a first reflection face that reflects the light input from the first lens, to the second curve portion, is formed on an outer peripheral face of the first curve portion, a second reflection face that reflects the reflected light to the second lens is formed on an outer peripheral face of the second curve portion, the light input to the first lens travels in the transparent medium until reading the second lens, is output from the second lens, and then forms an image at magnification of erection equal-magnification.

13 Claims, 13 Drawing Sheets

|  | VARIATION 1 | VARIATION 2 | VARIATION 3 | VARIATION 4 |
|---|---|---|---|---|
| LENS FACE S1 | FREE CURVED FACE | ASPHERIC FACE | FREE CURVED FACE | FREE CURVED FACE |
| REFLECTION FACE S2 | FLAT FACE | FREE CURVED FACE | ASPHERIC FACE | FREE CURVED FACE |
| REFLECTION FACE S3 | FLAT FACE | FREE CURVED FACE | ASPHERIC FACE | FREE CURVED FACE |
| LENS FACE S4 | FREE CURVED FACE | ASPHERIC FACE | FREE CURVED FACE | FREE CURVED FACE |

FIG. 5

| FACE NUMBER S | DESCRIPTION | MAIN CROSS-SECTIONAL CENTER CURVATURE r | FACE DISTANCE d | MATERIAL/REFRACTIVE INDEX, ABBE NUMBER |
|---|---|---|---|---|
| | ORIGINAL DOCUMENT FACE OB | ∞ | 3.4 mm | |
| 1 | ASPHERIC FACE | (FACE SHAPE IS SEPARATELY DESCRIBED) | 0.9 mm | nd = 1.532   νd = 56 |
| 2 | FREE CURVED FACE (REFLECTION FACE) | (FACE SHAPE IS SEPARATELY DESCRIBED) | 1.2 mm | |
| | INTERMEDIATE IMAGE | | 1.2 mm | |
| 3 | FREE CURVED FACE (REFLECTION FACE) | (FACE SHAPE IS SEPARATELY DESCRIBED) | 0.9 mm | |
| 4 | ASPHERIC FACE | (FACE SHAPE IS SEPARATELY DESCRIBED) | 3.4 mm | nd = 1.532   νd = 56 |
| | SENSOR FACE SS | ∞ | | |

FIG. 6

DEFINITION FORMULA OF
FACE SHAPE OF FREE CURVED FACE
(xy POLYNOMIAL EXPRESSION FACE)

$$Z = \frac{cr^2}{1 + \{1 - (1+k)c^2r^2\}} + \sum_{j=2}^{66} C_j x^m y^n$$

$$r = (x^2 + y^2)^{1/2}$$

$$j = \{(m+n)^2 + m + 3n\}/2 + 1$$

Z: SEG AMOUNT OF FACE PARALLEL TO z AXIS
c: VERTEX RATE(CUY)
k: CONIC COEFFICIENT
$C_j$: COEFFICIENT OF MONOMIAL $x^m y^n$

FIG. 7

DEFINITION FORMULA OF
FACE SHAPE OF ASPHERIC FACE
(ROTATION SYMMETRY ASPHERIC FACE)

$$Z = \frac{cr^2}{1 + \{1 - (1+k)c^2r^2\}} + A_4 r^4 + A_6 r^6 + A_8 r^8 + A_{10} r^{10}$$

$$r = (x^2 + y^2)^{1/2}$$

Z: SEG AMOUNT OF FACE PARALLEL TO z AXIS
c: VERTEX RATE(CUY)
k: CONIC COEFFICIENT
$A_j$: COEFFICIENT OF MONOMIAL $r^j$

FIG. 8

| Y CURVATURE RADIUS | 0.643498896 |
|---|---|
| CONIC CONSTANT (K) | −1.853463084 |
| FOURTH-ORDER COEFFICIENT $A_4$ | −0.445424471 |
| SIXTH-ORDER COEFFICIENT $A_6$ | 59.59458395 |
| EIGHTH-ORDER COEFFICIENT $A_8$ | −1154.506556 |
| TENTH-ORDER COEFFICIENT $A_{10}$ | 7485.236586 |

FIG. 9

|  | Y CURVATURE RADIUS | −163.38043 |
| --- | --- | --- |
| $C_1$ | CONIC CONSTANT | −3517.9983 |
| $C_2$ | X (&X) | 0.00067553 |
| $C_3$ | Y (&Y) | 0.00979425 |
| $C_4$ | X**2 | −0.0006962 |
| $C_5$ | X * Y | −0.0002947 |
| $C_6$ | Y**2 | −0.0156866 |
| $C_7$ | X**3 | −0.0048312 |
| $C_8$ | X**2 * Y | −0.0021266 |
| $C_9$ | X Y**2 | −0.0084159 |
| $C_{10}$ | Y**3 | 0.00159722 |
| $C_{11}$ | X**4 | −0.0627566 |
| $C_{12}$ | X**3 * Y | 0.00778866 |
| $C_{13}$ | X**2 * Y**2 | 0.27703185 |
| $C_{14}$ | X * Y**3 | 0.00314189 |
| $C_{15}$ | Y**4 | 0.28690951 |

"**" IN TABLE REPRESENTS EXPONENTIATION, AND SUBSEQUENT NUMBER REPRESENTS EXPONENT

FIG. 10

|  | Y CURVATURE RADIUS | 11.2466233 |
|---|---|---|
| $C_1$ | CONIC CONSTANT | −1089.7865 |
| $C_2$ | X (&X) | −0.0056468 |
| $C_3$ | Y (&Y) | −0.0090056 |
| $C_4$ | X**2 | −0.0090869 |
| $C_5$ | X * Y | −0.0008582 |
| $C_6$ | Y**2 | 0.01823545 |
| $C_7$ | X**3 | −0.0022566 |
| $C_8$ | X**2 * Y | 0.00293307 |
| $C_9$ | X Y**2 | −0.0053477 |
| $C_{10}$ | Y**3 | 0.00493637 |
| $C_{11}$ | X**4 | −0.0325934 |
| $C_{12}$ | X**3 * Y | 0.01078609 |
| $C_{13}$ | X**2 * Y**2 | 0.03190657 |
| $C_{14}$ | X * Y**3 | −0.0002449 |
| $C_{15}$ | Y**4 | −0.0511922 |

"**" IN TABLE REPRESENTS EXPONENTIATION, AND SUBSEQUENT NUMBER REPRESENTS EXPONENT

FIG. 11

| Y CURVATURE RADIUS | −0.801273619 |
|---|---|
| CONIC CONSTANT (K) | 0 |
| FOURTH-ORDER COEFFICIENT $A_4$ | 0.506244467 |
| SIXTH-ORDER COEFFICIENT $A_6$ | −17.94166344 |
| EIGHTH-ORDER COEFFICIENT $A_8$ | 308.8197227 |
| TENTH-ORDER COEFFICIENT $A_{10}$ | −1833.808266 |

FIG. 15

| Y CURVATURE RADIUS | 0.702631616 |
|---|---|
| CONIC CONSTANT (K) | −0.987976529 |
| FOURTH-ORDER COEFFICIENT $A_4$ | −0.478152081 |
| SIXTH-ORDER COEFFICIENT $A_6$ | 45.73049501 |
| EIGHTH-ORDER COEFFICIENT $A_8$ | −800.7604348 |
| TENTH-ORDER COEFFICIENT $A_{10}$ | 4701.981451 |

FIG. 16

| | Y CURVATURE RADIUS | −8.5680374 |
|---|---|---|
| $C_1$ | CONIC CONSTANT | −417.65081 |
| $C_2$ | X (&X) | 0.001066 |
| $C_3$ | Y (&Y) | 0.00406107 |
| $C_4$ | X**2 | 0.01556302 |
| $C_5$ | X * Y | −0.0229489 |
| $C_6$ | Y**2 | −0.0120892 |
| $C_7$ | X**3 | −0.0211527 |
| $C_8$ | X**2 * Y | 0.02052058 |
| $C_9$ | X Y**2 | −0.0336964 |
| $C_{10}$ | Y**3 | −0.0098878 |
| $C_{11}$ | X**4 | −0.4453195 |
| $C_{12}$ | X**3 * Y | 0.0710509 |
| $C_{13}$ | X**2 * Y**2 | 0.26060884 |
| $C_{14}$ | X * Y**3 | 0.03414538 |
| $C_{15}$ | Y**4 | 0.2556218 |

"**" IN TABLE REPRESENTS EXPONENTIATION, AND SUBSEQUENT NUMBER REPRESENTS EXPONENT

FIG. 17

|       |                   |              |
|-------|-------------------|--------------|
|       | Y CURVATURE RADIUS | 6.26297023  |
| $C_1$ | CONIC CONSTANT    | -74.543857   |
| $C_2$ | X (&X)            | -0.000777    |
| $C_3$ | Y (&Y)            | -0.0026548   |
| $C_4$ | X**2              | -0.0213105   |
| $C_5$ | X * Y             | -0.0102168   |
| $C_6$ | Y**2              | 0.0786689    |
| $C_7$ | X**3              | -0.0058057   |
| $C_8$ | X**2 * Y          | -0.0063496   |
| $C_9$ | X Y**2            | -0.0034324   |
| $C_{10}$ | Y**3           | -0.0124949   |
| $C_{11}$ | X**4           | -0.0096957   |
| $C_{12}$ | X**3 * Y       | 0.04046494   |
| $C_{13}$ | X**2 * Y**2    | -0.0265893   |
| $C_{14}$ | X * Y**3       | 0.00653153   |
| $C_{15}$ | Y**4           | -0.0687694   |

"**" IN TABLE REPRESENTS EXPONENTIATION, AND SUBSEQUENT NUMBER REPRESENTS EXPONENT

FIG. 18

| | |
|---|---|
| Y CURVATURE RADIUS | -1.547511147 |
| CONIC CONSTANT (K) | 0 |
| FOURTH-ORDER COEFFICIENT $A_4$ | 0.025299896 |
| SIXTH-ORDER COEFFICIENT $A_6$ | -12.95948234 |
| EIGHTH-ORDER COEFFICIENT $A_8$ | 200.612826 |
| TENTH-ORDER COEFFICIENT $A_{10}$ | -1004.571957 |

IMAGE FORMING OPTICAL ELEMENT, IMAGE FORMING OPTICAL ARRAY, AND IMAGE READING DEVICE

CROSS REFERENCES TO RELATED APPLICATIONS

The entire disclosure of Japanese Patent Application Nos. 2011-010746, filed Jan. 21, 2011, and 2011-010747, filed Jan. 21, 2011, are expressly incorporated by reference herein.

BACKGROUND

1. Technical Field

The present invention relates to an image forming optical element that forms an erected image of an object, an image forming optical array provided with the image forming optical element, and an image reading device that reads an image of an object using the image forming optical element.

2. Related Art

In an image scanner, a facsimile, a copier, and a financial terminal device, a contact image sensor module (hereinafter, referred to as "CIS module") is used as an image reading device. The CIS module irradiates a reading target with light, and detects reflected light at that time, to read an image of the reading target by an optical sensor. To appropriately lead the light reflected from the reading target, to an optical sensor, it is general to use an image forming optical element having image forming magnification such as erection equal-magnification. That is, the image forming optical element forms an image with the light reflected from the reading target at the erection equal-magnification, and forms the erection equal-magnification image of the reading target to the optical sensor. The optical sensor detects the erection equal-magnification image formed by the image forming optical element, to read the image of the reading target.

In JP-A-2000-066134, to improve the degree of freedom of a layout in the CIS module or to make the CIS module thin, an image forming optical element reflecting the light by each of a roof prism and a flat reflection face to change a direction of an optical axis (bend the optical axis) is proposed. The image forming optical element is provided with an object side lens that is opposed to the reading target, and an image forming side lens that forms the image of the reading target on the image forming face in cooperation with the object side lens. The roof prism is disposed on an optical path from the object side lens to the image forming side lens, and the flat reflection face is disposed on an optical path from the image forming side lens to the image forming face (optical sensor). Accordingly, the light reflected from the reading target and passing through the object side lens is reflected by the roof prism lens, a progress direction thereof is changed, the light passing through the image forming side lens is reflected by the flat reflection face, and the progress direction is changed.

In JP-A-2000-066134, the direction of the optical axis can be changed using two reflection faces (roof prism and flat reflection face) in each reflection faces. As a result, it is easy to improve the degree of freedom of the layout in the CIS module and to make the CIS module thin. However, in JP-A-2000-066134, each of lenses of the object side, image forming side lenses, and two reflection faces are separately provided, a relative positional relationship of such optical members may not be determined with high precision, and performance of forming an image of the image forming optical element may be decreased.

SUMMARY

An advantage of some aspects of the invention is to provide an image forming optical element changing a direction of an optical axis using two reflection faces, an image forming optical array provided with the image forming optical element, and an image reading device reading an image of an object using the image forming optical element, in which a relative positional relationship of optical members such as a lens and a reflection face is determined with high precision to improve performance of forming the image of the image forming optical element.

Application Example 1

According to an application example of the invention, there is provided an image forming optical element, wherein a first lens to which light is input from an object, a second lens that outputs light, and a light guiding unit that leads the light input from the first lens to the second lens are integrally formed by a transparent medium, wherein the light guiding unit has a curved shape of a first curve portion and a second curve portion from the first lens to the second lens, wherein the first curve portion is provide with a first reflection face that reflects the light input from the first lens, to the second curve portion, wherein the second curve portion is provide with a second reflection face that reflects the light reflected by the first reflection face, to the second lens, and wherein the light input to the first lens travels in the transparent medium from the first lens to the second lens through the first reflection face and the second reflection face, and forms an image at magnification of erection equal-magnification after the outputting from the second lens.

With such a configuration, the incident side first lens and the output side second lens are connected by the light guiding unit. The light guiding unit has the curved shape of the first curve portion and the second curve portion from the first lens to the second lens. The first curve portion is provided with the first reflection face that reflects the light input from the first lens, to the second curve portion, and the second curve portion is provided with the second reflection face that reflects the light reflected by the first reflection face to the second lens. Accordingly, the light input to the first lens is reflected by the first reflection face and the second reflection face, and then is output from the second lens.

The light guiding unit provided with the first reflection face and the second reflection face, and the first lens and the second lens connected by the light guiding unit are integrally formed by the transparent medium. Accordingly, the relative positional relationship of the first lens, the first reflection face, the second reflection face, and the second lens can be regularly formed with high precision, and thus it is possible to improve performance of forming an image of the image forming optical element.

Application Example 2

In the image forming optical element according to the application example, a first reflection film that reflects the light input from the first lens, to the second curve portion, may be formed on an outer peripheral face of the first curve portion, and a second reflection film that reflects the light reflected by the first reflection film, to the second lens, may be formed on an outer peripheral face of the second curve portion.

With such a configuration, the reflection films are formed on the outer peripheral faces of the first curve portion and the second curve portion, it is possible to obtain high reflection efficiency, and thus it is possible to reduce loss of light quantity occurring at the time of reflection.

Application Example 3

In the image forming optical element according to the application example, at least one of the first reflection film and the second reflection film may have a plane shape.

Application Example 4

In the image forming optical element according to the application example, at least one of the first reflection film and the second reflection film may have a curved face shape.

Application Example 5

In the image forming optical element according to the application example, the first reflection film may be a metal film evaporated on the outer peripheral face of the first curve portion, and the second reflection film may be a metal film evaporated on the outer peripheral face of the second curve portion.

Application Example 6

According to another application example of the invention, there is provided an image forming optical array, wherein a plurality of the image forming optical elements according to the application example are integrally arranged.

With such a configuration, the incident side first lens and the output side second lens are connected by the light guiding unit. The light guiding unit has the curved shape of the first curve portion and the second curve portion from the first lens to the second lens. The first curve portion is provided with the first reflection face that reflects the light input from the first lens, to the second curve portion, and the second curve portion is provided with the second reflection face that reflects the light reflected by the first reflection face to the second lens. Accordingly, the light input to the first lens is reflected by the first reflection face and the second reflection face, and then is output from the second lens.

The light guiding unit provided with the first reflection face and the second reflection face, and the first lens and the second lens connected by the light guiding unit are integrally formed by the transparent medium. Accordingly, the relative positional relationship of the first lens, the first reflection film, the second reflection film, and the second lens can be regularly formed with high precision, and thus it is possible to improve performance of forming an image of the image forming optical element.

Application Example 7

According to still another application example of the invention, there is provided an image reading device including: a light source unit that irradiates an object with light; the image forming optical element according to the application example; and a reading unit that reads an erection equal-magnification image of the object formed by the image forming optical element.

With such a configuration, the incident side first lens and the output side second lens are connected by the light guiding unit. The light guiding unit has the curved shape of the first curve portion and the second curve portion from the first lens to the second lens. The first curve portion is provided with the first reflection face that reflects the light input from the first lens, to the second curve portion, and the second curve portion is provided with the second reflection face that reflects the light reflected by the first reflection face to the second lens. Accordingly, the light input to the first lens is reflected by the first reflection face and the second reflection face, and then is output from the second lens.

The light guiding unit provided with the first reflection face and the second reflection face, and the first lens and the second lens connected by the light guiding unit are integrally formed by the transparent medium. Accordingly, the relative positional relationship of the first lens, the first reflection film, the second reflection film, and the second lens can be regularly formed with high precision, and thus it is possible to improve performance of forming an image of the image forming optical element.

Application Example 8

In the image forming optical element according to the application example, each of the first reflection face and the second reflection face may be a total reflection face that totally reflects light.

With such a configuration, in the first reflection face and the second reflection face, the total refection is used, and thus it is possible to reduce loss of light quantity.

Application Example 9

In the image forming optical element according to the application example, each of the first reflection face and the second reflection face may be a total reflection face formed on an inner interface of the light guiding unit.

With such a configuration, the light input to the light guiding unit travels into the transparent medium, air is not interposed, and thus it is possible to improve efficiency of using light.

Application Example 10

In the image forming optical element according to the application example, at least one of the first reflection face and the second reflection face may have a plane shape.

Application Example 11

In the image forming optical element according to the application example, at least one of the first reflection face and the second reflection face may have a curved face shape.

Application Example 12

According to still another application example of the invention, there is provided a plurality of the image forming optical elements according to the application example are integrally arranged.

With such a configuration, the incident side first lens and the output side second lens are connected by the light guiding unit. The light guiding unit has the curved shape of the first curve portion and the second curve portion from the first lens to the second lens. The first curve portion is provided with the first reflection face that reflects the light input from the first lens, to the second curve portion, and the second curve portion is provided with the second reflection face that reflects the light reflected by the first reflection face to the second lens. Accordingly, the light input to the first lens is reflected by the first reflection face and the second reflection face, and then is output from the second lens.

The light guiding unit provided with the first reflection face and the second reflection face, and the first lens and the second lens connected by the light guiding unit are integrally formed by the transparent medium. Accordingly, the relative positional relationship of the first lens, the first reflection film, the second reflection film, and the second lens can be regularly formed with high precision, and thus it is possible to improve performance of forming an image of the image forming optical element.

Application Example 13

According to still another application example of the invention, there is provided an image reading device including: a light source unit that irradiates an object with light; the image forming optical element according to the application example; and a reading unit that reads an erection equal-magnification image of the object formed by the image forming optical element.

With such a configuration, the incident side first lens and the output side second lens are connected by the light guiding unit. The light guiding unit has the curved shape of the first curve portion and the second curve portion from the first lens to the second lens. The first curve portion is provided with the first reflection face that reflects the light input from the first lens, to the second curve portion, and the second curve portion is provided with the second reflection face that reflects the light reflected by the first reflection face to the second lens. Accordingly, the light input to the first lens is reflected by the first reflection face and the second reflection face, and then is output from the second lens.

The light guiding unit provided with the first reflection face and the second reflection face, and the first lens and the second lens connected by the light guiding unit are integrally formed by the transparent medium. Accordingly, the relative positional relationship of the first lens, the first reflection face, the second reflection face, and the second lens can be regularly formed with high precision, and thus it is possible to improve performance of forming an image of the image forming optical element.

BRIEF DESCRIPTION OF THE DRAWINGS

The invention will be described with reference to the accompanying drawings, wherein like numbers reference like elements.

FIG. 5 is a diagram illustrating a configuration of the optical system exemplified in variation 2 by a table.

FIG. 6 is a diagram illustrating a definition formula of a shape of a free curved face.

FIG. 7 is a diagram illustrating a definition formula of a shape of an aspheric face.

FIG. 8 is a diagram illustrating a coefficient providing the aspheric face shape of the first lens in Embodiment 1.

FIG. 9 is a diagram illustrating a coefficient providing the free curved face shape of the first reflection film in Embodiment 1.

FIG. 10 is a diagram illustrating a coefficient providing the free curved face shape of the second reflection film in Embodiment 1.

FIG. 11 is a diagram illustrating a coefficient providing the aspheric face shape of the second lens in Embodiment 1.

FIG. 15 is a diagram illustrating a coefficient providing the aspheric face shape of the first lens in Embodiment 2.

FIG. 16 is a diagram illustrating a coefficient providing the free curved face shape of the first reflection film in Embodiment 2.

FIG. 17 is a diagram illustrating a coefficient providing the free curved face shape of the second reflection film in Embodiment 2.

FIG. 18 is a diagram illustrating a coefficient providing the aspheric face shape of the second lens in Embodiment 2.

DESCRIPTION OF EXEMPLARY EMBODIMENTS

Embodiment 1

Figure 1:
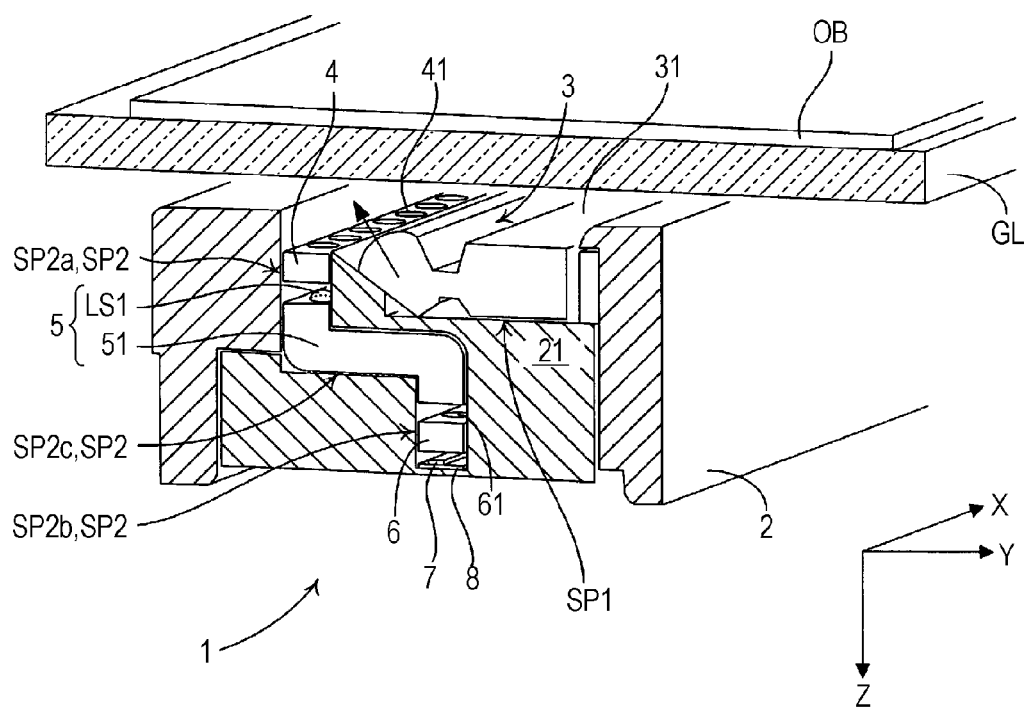
FIG. 1 is a partial cross-sectional perspective view illustrating a schematic configuration an image reading device according to Embodiment 1 of the invention.
Figures 2, 3:
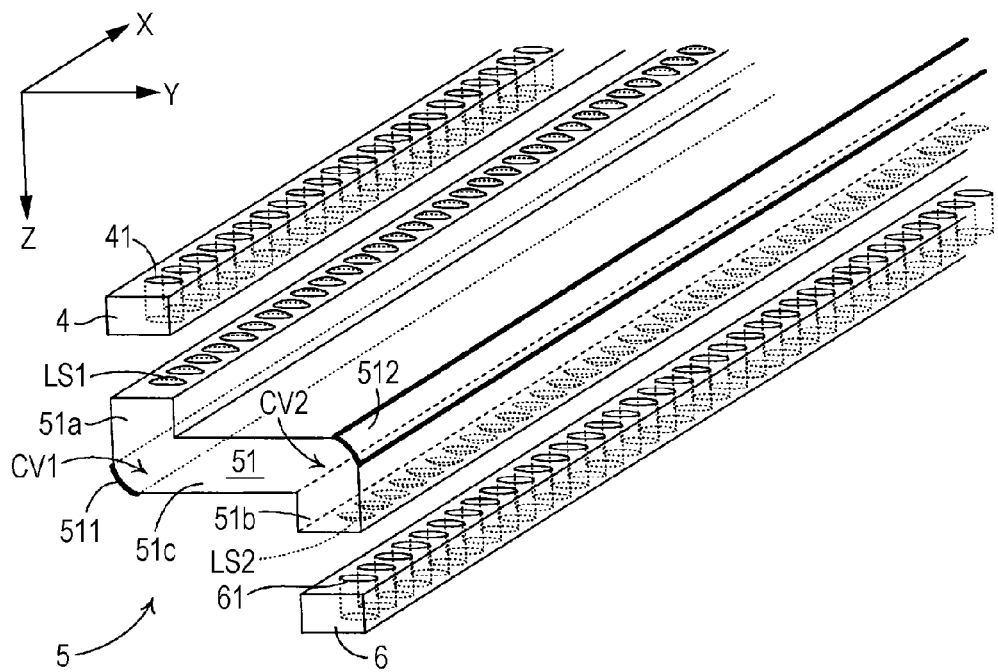
FIG. 2 is a perspective view illustrating a lens array in Embodiment 1.
FIG. 3 is a diagram illustrating variation of shapes of a first lens, a second lens, a first reflection film, and a second reflection film.

FIG. 1 is a partial cross-sectional perspective view illustrating a schematic configuration of a CIS module 1 of an image reading device according to an embodiment of the invention. FIG. 2 is a perspective view illustrating an incident side aperture member, a lens array 5, and an output side aperture member. In the drawings described by Embodiment 1, XYZ orthogonal coordinates are appropriately represented to show positional relationship of members. An arrow side of a coordinate axis is a positive side, and the opposite side to the arrow side of the coordinate axis is a negative side. In the following description, it is appropriately considered that the negative side of the Z direction is the upper side, the positive side of the Z direction is the lower side, the negative side of the Y direction is the left side, the positive side of the Y direction is the right side, the negative side of the Z direction is the front side, and the positive side of the X direction is the rear side.

The CIS module 1 is a device that reads an original document OB placed on an original document glass GL to read an image printed on the original document OB as a reading target, and is disposed just under the original document glass GL. The CIS module 1 has a rectangular frame 2 extending longer than a reading range of the original document OB in an X direction, and is provided with a light source unit 3, an incident side aperture member 4, a lens array 5, an output side aperture member 6, a sensor 7, and a printed circuit board 8 in the frame 2.

In the frame 2, a first accommodating space SP1 for accommodating the light source unit 3 irradiating the original document OB with light, and a second accommodating space SP2 for accommodating functional units 4, 5, 6, 7, and 8 for reading the original document OB, are separated by a separator 21. The first accommodating space SP1 is provided at an upper position in the frame 2. Meanwhile, the second accommodating space SP2 is provided to get from the left side to the lower side in the first accommodating space SP1 on the cross section (hereinafter, referred to as "sub-scanning cross section") including the YZ plane. More specifically, the second accommodating space SP2 includes an upper vertical space SP2$a$ extending from the left side of the first accommodating space SP1 in the Z direction (up and down direction), a lower vertical space SP2$b$ extending from the lower side of the first accommodating space SP2 in the Z direction (up and down direction), and a left and right space SP2c extending in the Y direction (left and right direction) to connect an lower end of the upper vertical space SP2a and an upper end of the lower vertical space of the upper vertical space SP2a. As a result, the second accommodating space SP2 perpendicularly curved from the upper vertical space SP2a to the left and right space SP2c and perpendicularly curved from the left and right space SP2c to the lower vertical space SP2b is formed.

A light source of the light source unit 3 is an LED (Light Emitting Diode) (not shown). The LED emits illumination light from one end in the X direction of the light guide 31 into the light guide 31. As shown in FIG. 1, the light guide 31 has substantially the same length as the maximum reading range, and is provided along the X direction on the upper face of the separator 21. When the illumination light is input to the one end, the light is emitted from each portion of the light guide 31 to the original document glass GL partially through the leading end (light output face) while propagating in the light guide 31 to the other end of the light guide 31, and the original document OB on the original document glass GL is irradiated with the light. As a result, the stripe-shaped illumination light extending in the X direction is irradiated to the original document OB, and is reflected by the original document OB.

At the position just under the irradiation position of the illumination light, the upper vertical space SP2a is provided, and the incident side aperture member 4 is disposed at the end portion. The incident side aperture member 4 has substantially the same length as the maximum reading range, and is provided along the X direction. The incident side aperture member 4 is provided a plurality of through-holes 41 in a line at a predetermined pitch in the X direction, to serve as the incident side aperture with respect to a plurality of first lenses LS1 provided in each lens array 5.

The lens array 5 has the substantially same length as the maximum reading range and is provided along the X direction. The whole of the lens array 5 can be inserted to the second accommodating space SP2. The lens array 5 includes a upper convex first lens LS1 (incident side lens), a lower convex second lens LS2 (output side lens) disposed at the lower portion of the first lens LS1 and on the right side, and a light guiding unit 51 connecting the first lens LS1 and the second lens LS2.

The light guiding unit 51 is formed of an upper vertical portion 51a growing in the Z direction, left and right portions 51c perpendicularly curved from the lower end of the upper vertical portion 51a and extending to the right side, and a lower vertical portion 51b perpendicularly curved from the right end of the left and right portions 51c and extending downward. That is, the light guiding unit 51 has a shape perpendicularly curved by a first curve portion CV1 from the upper vertical portion 51a to the left and right portions 51c and perpendicularly curved by a second curve portion CV2 from the left and right portions 51c to the lower vertical portion 51b.

On the upper face of the upper vertical portion 51a of the light guiding unit 51, a plurality of first lenses LS1 corresponding to, one-to-one, a plurality of through-holes 41 of the incident side aperture member 4 are arranged in a line at a predetermined pitch in the X direction. On the lower vertical portion 51b of the light guiding unit 51, a plurality of second lenses LS2 corresponding to, one-to-one, a plurality of first lenses LS1 are formed in a line at a predetermined pitch in the X direction. Accordingly, the illumination light input to the first lens LS1 is led to the second lens LS2 by the light connection unit 51.

In the light guiding unit 51, a first reflection film 511 and a second reflection film 512 are formed to lead the incident light from the first lens LS1 to the second lens LS2. The first reflection film 511 is a metal film evaporated on the outer peripheral face of the first curve portion CV1 curved from the upper vertical portion 51a of the light guiding unit 51 to the left and right portions 51c, and reflects the illumination light input from the first lens LS1 to the second curve portion CV2. The second reflection film 512 is a metal film evaporated on the outer peripheral face of the second curve portion CV2 curved from the left and right portions of the light guiding unit 51 to the lower vertical portion 51b, and reflects the illumination light reflected by the first reflection film 511 to the second lens LS2. As a result, the light input to the first lens LS1 is reflected by the first reflection film 511 and the second reflection film 512, and is led to the second lens LS2.

The plurality of first lenses LS1, the light guiding unit 51, and the plurality of second lenses LS2 are integrally formed by the transparent medium such as resin and glass having optical permeability with respect to the illumination light. Accordingly, the illumination light input to the first lens LS1 advances in the transparent medium from the first lens LS1 to the second lens LS2 through the first reflection film 511 and the second reflection film 512.

As a result, the illumination light passing through the lens array 5 is output from the second lens LS2, and then forms an image at magnification of erection equal-magnification. In the formation of the lens array 5, the units (for example, the first lens LS1, the light guiding unit 51, and the second lens LS2) may be separately formed, then they may be adhered and integrated, and the whole of the lens array 5 may be integrally formed without separately forming the units.

The lens array 5 configured as described above is disposed from the upper vertical space SP2a of the second accommodating space SP2 through the left and right space SP2c to the lower vertical space SP2b. Meanwhile, in the lower vertical space SP2b, an output side aperture member 6 is disposed to be interposed between the lens array 5 and the optical sensor 7. The output side aperture member 6 has substantially the same length as the maximum reading range and is provided along the X direction in the same manner as the input side aperture member 4. The output side aperture member 6 is provided a plurality of through-holes 61 parallel in the X direction. The plurality of through-holes 61 are provided corresponding to, one-to-one, the plurality of second lenses LS2, and each through-hole 61 serves as the output side aperture of the corresponding second lens LS2.

On the lower face of the lower vertical space SP2c, the optical sensor 7 and the printed circuit board 8 provided with the same are disposed. The optical sensor 7 detects an erection equal-magnification image formed by the lens array 5 and reads an image of the original document OB. As a result, a signal relating to the image of the original document OB is output from the optical sensor 7.

As described above, in Embodiment 1, the input side first lens LS1 and the output side second lens LS2 are connected by the light guide unit 51. The light guiding unit 51 has a bend shape of the first curve portion CV1 and the second curve portion CV2 from the first lens LS1 to the second lens LS2. On an outer peripheral face of the first curve portion CV1, a first reflection film 511 reflecting the light input from the first lens LS1, to the second curve portion CV2, is formed. On an outer peripheral face of the second curve portion CV2, a second reflection film 512 reflecting the light reflected by the first reflection film 511, to the second lens LS2, is formed. Accordingly, the light input to the first lens LS1 is reflected by the first reflection film 511 and the second reflection film 512, and then is output from the second lens LS2.

In Embodiment 1, the light guide 51 provided with the first reflection film 511 and the second reflection film 512, and the first lens LS1 and the second lens LS2 connected by the light guiding unit 51 are integrally formed by a transparent medium. Accordingly, the relative positional relationship of the first lens LS1, the first reflection film 511, the second reflection film 512, and the second lens LS2 is determined with high precision, and it is possible to improve performance of forming an image of the image forming optical element configured by the optical members LS1, 511, 512, and LS2.

In Embodiment 1, the first lens LS1, the light guiding unit 51, and the second lens LS2 are integrally formed by the transparent medium, and the light input to the first lens LS1 travels in the transparent medium from the first lens LS1 to the second lens LS2 through the first reflection film 511 and the second reflection film 512. That is, in Embodiment 1, there is no air among the optical members of the first lens LS1, the first reflection film 511, the second reflection film 512, and the second lens LS2. As a result, the light on the interface between the optical member and the air is prevented from being reflected, and there is an effect that it is possible to improve efficiency of using the light.

Although not described in the above description, the shapes of the first lens LS1, the second lens LS2, the first reflection film 511, and the second reflection film 512 may be assumed by various variations. FIG. 3 is a diagram illustrating a table of variations of face shapes of the first lens LS1, the second lens LS2, the first reflection film 511, and the second reflection film 512. In FIG. 3, a reference sign S1 is attached to the lens face of the first lens LS1, a reference sign S2 is attached to the first reflection film 511, a reference sign S3 is attached to the second reflection film 512, and a reference sign S4 is attached to the lens face of the second lens LS2.

In the example shown in variation 1, the first reflection film S2 and the second reflection film S3 are planes, and thus there is an advantage that resolution is not decreased by the first reflection film S2 and the second reflection film S3. In the example shown in variation 2, the first reflection film S2 and the second reflection film S3 are curved faces, the resolution is slightly decreased by the first reflection film S2 and the second reflection film S3, but the first reflection film S2 and the second reflection film S3 are free curved faces, thereby improving the decrease of the resolution. In the example shown in variation 3, the first reflection film S2 and the second reflection film S3 are curved faces, thus the resolution is slightly decreased by the first reflection film S2 and the second reflection film S3, but the first reflection film S2 and the second reflection film S3 are free curved faces, thereby improving the decrease of the resolution. In variation 4, all optical faces S1 to S4 are free curved faces, the degree of freedom in design is rapidly raised, and thus it is possible to further improve the resolution.

Figure 4:
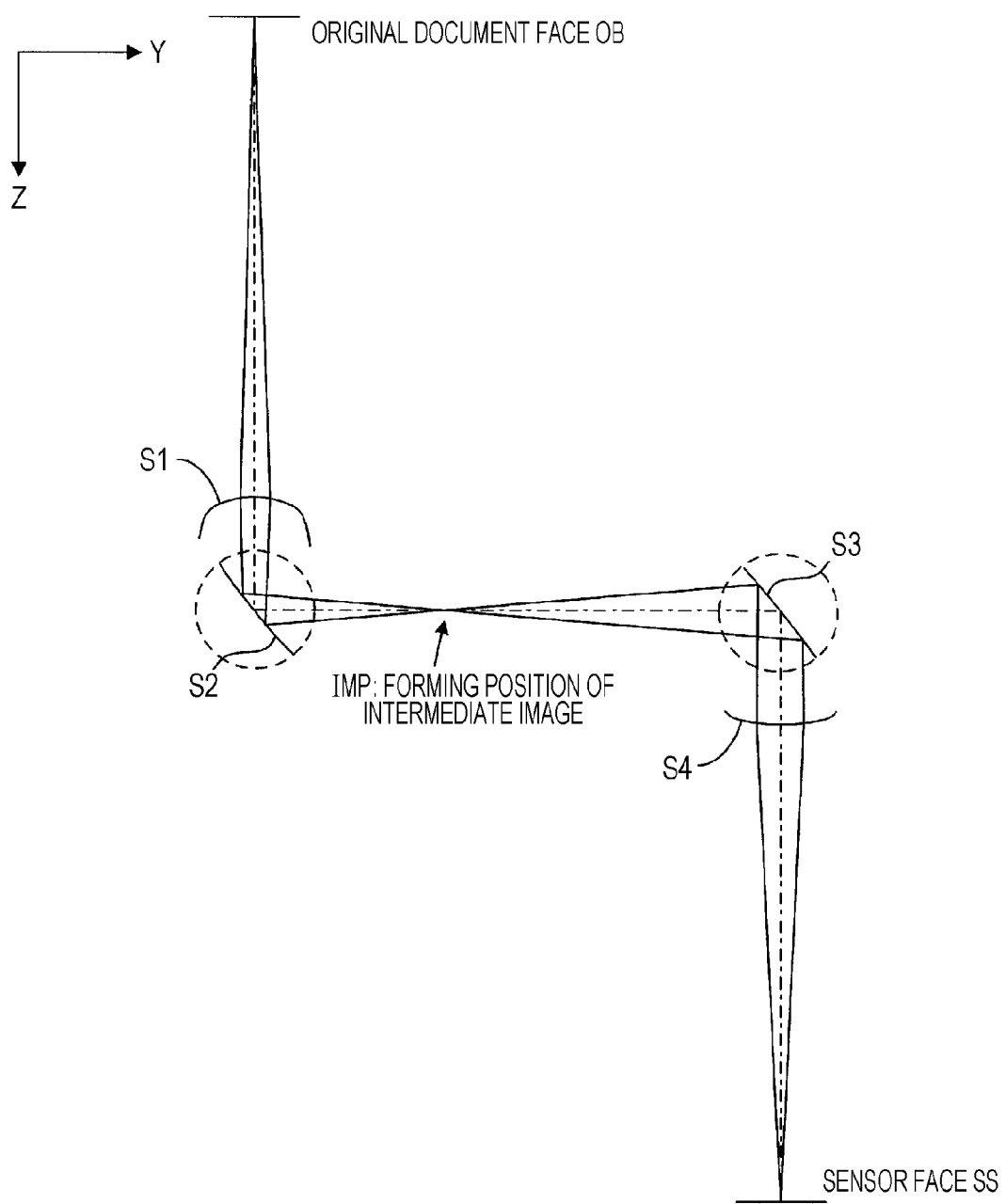
FIG. 4 is a light beam diagram of an optical system exemplified in variation 2 in Embodiment 1.

A specific configuration of the optical system exemplified by variation 2 will be described. FIG. 4 is a light beam diagram exemplified in variation 2. FIG. 5 is a diagram illustrating a table of a configuration of the optical system exemplified in variation 2. In FIG. 4 and FIG. 5, a reference sign S1 is attached to the first lens face of the first lens LS1, a reference sign S2 is attached to the first reflection film 511, a reference sign S3 is attached to the second reflection film 512, and a reference sign S4 is attached to the lens face of the second lens LS2. FIG. 6 is a diagram illustrating a definition formula of a face shape of a free curved face (xy polynomial expression face). FIG. 7 is a diagram illustrating a definition formula of a shape of an aspheric face (rotation symmetric aspheric face). FIG. 8 is a diagram illustrating a table of a coefficient providing an aspheric face shape of the lens face of the first lens. FIG. 9 is a diagram illustrating a table of a coefficient providing a free curved face shape of the first reflection film 511. FIG. 10 is a diagram illustrating a table of a coefficient providing a free curved face shape of the second reflection film 512. FIG. 11 is a diagram illustrating a table of a coefficient providing an aspheric face shape of the lens face of the second lens LS2.

The light from the original document OB is input to the lens face S1 of the first lens LS1, travels in the Z direction, then is reflected by the first reflection film S2 to change the proceeding direction to the Y direction, and goes toward the second reflection film S3. In this case, an intermediate image is formed at a position IMP between the first reflection film S2 and the second reflection film S3 by operations of the lens face S1 having the aspheric face shape and the first reflection film S2 having the free curved face shape.

The light from the intermediate image travels in the Y direction, is further reflected by the second film S3 to change proceeding direction to the Z direction, and goes toward the lens face S4 of the second lens LS2. As a result, the light reflected by the second reflection film S3 travels in the Z direction, passes through the lens face S4, and then forms an image on a sensor face SS of the optical sensor 7.

As described above, the optical system shown in FIG. 4 to FIG. 11 changes the proceeding direction of the light by two reflection films S2 and S3, that is, changes the direction of the optical axis (in FIG. 4, the optical axis is represented by a chain line). The optical system forms the intermediate image formed on the optical faces S1 and S2, on the optical faces S3 and S4, to form erection equal-magnification. As described above, the optical faces S1 to S4 are integrally formed by the transparent medium, it is possible to determine the relative positional relationship of the first lens S1, the first reflection film S2, the second refection film S3, and the second lens S4, with high precision. As a result, it is possible to improve performance of forming an image of the image forming optical element configured by the optical members S1 to S4.

In Embodiment 1 described above, the optical system configured by the first lens LS1, the first reflection film 511, the second reflection film 512, the second lens LS2 corresponds to "image forming optical element" of the invention, the lens array 5 in which the plurality of image forming optical elements are arranged corresponds to "image forming optical array" of the invention, and the CIS module 1 corresponds to "image reading device" of the invention. The light guiding unit 51 serves as "connection unit" of the invention.

Embodiment 2

Figure 13:
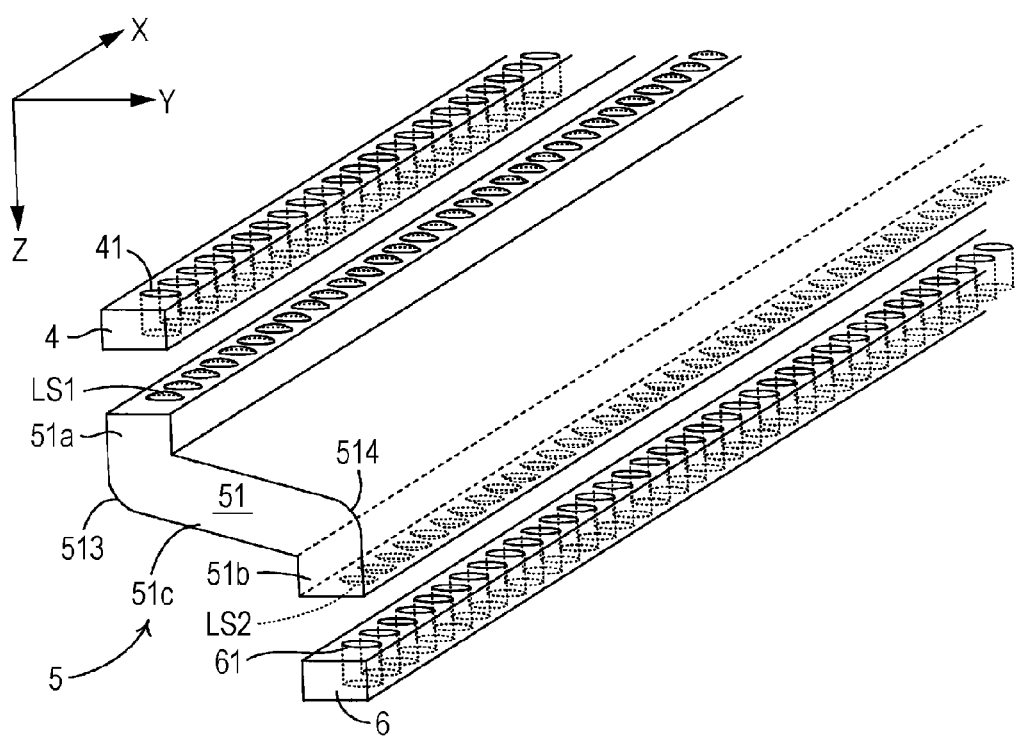
FIG. 13 is a perspective view illustrating a lens array in Embodiment 2.

Next, Embodiment 2 of the invention will be described with reference to FIG. 13 and FIG. 18. In the following description, the same reference numerals and signs are given to the same parts as the already described parts, and the description thereof is not repeated. In Embodiment 1, the first reflection film 511 and the second reflection film 512 reflecting the input light are formed on the outer peripheral face of the curve portion of the lens array 5. However, in Embodiment 2, a reflection film which totally reflects the incident light is formed in which the incident angle is an angle equal to or more than a threshold angle, in the peripheral face of the lens array 5.

Figure 12:
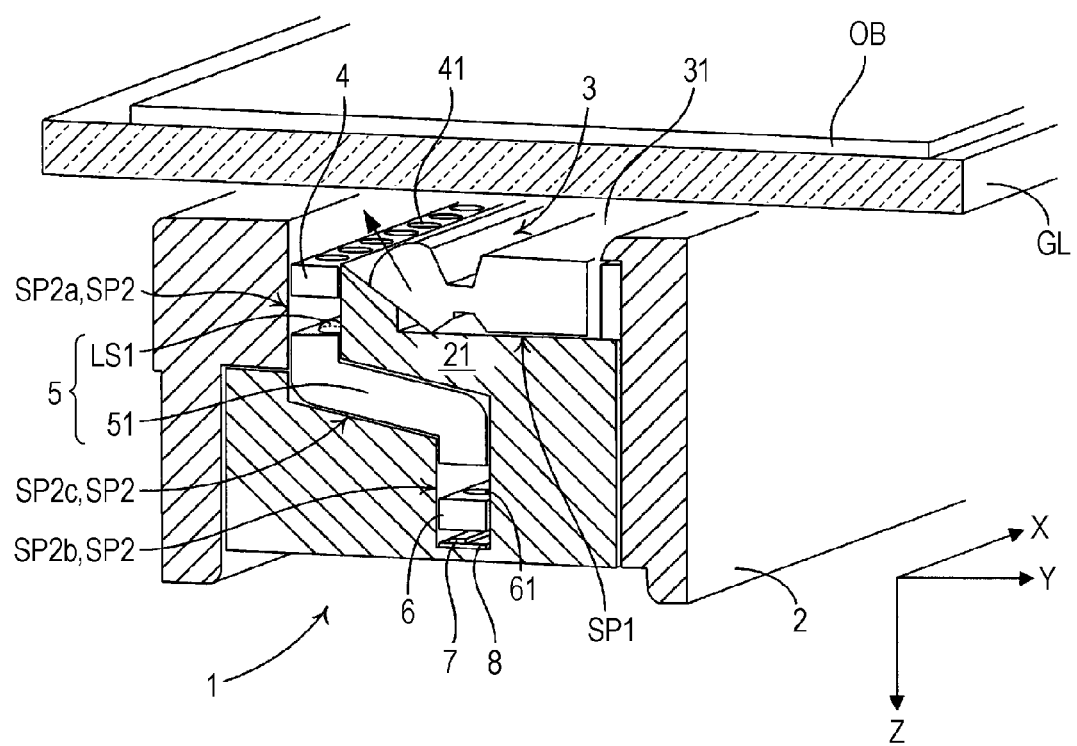
FIG. 12 is a partial cross-sectional perspective view illustrating a schematic configuration of an image reading device according to Embodiment 2 of the invention.

FIG. 12 is a partial cross-sectional perspective view illustrating a schematic configuration of a CIS module 1 of an image reading device according to an embodiment of the invention. FIG. 13 is a perspective view illustrating an incident side aperture member, a lens array 5, and an output side aperture member.

In Embodiment 1, the left and right space SP2c is formed in the direction extending in the Y direction (left and right direction) to connect the lower end of the upper vertical space SP2a and the upper end SP2b of the lower vertical space. However, in Embodiment 2, as shown in FIG. 12, the left and right spaces SP2c are provided slightly obliquely downward from the upper vertical space SP2a to the lower vertical space SP2b. As shown in FIG. 13, in the lens array 5, the left and right portions 51c are provided slight obliquely downward from the upper vertical portion 51a to the lower vertical portion 51b.

The light guiding unit 51 of the lens array 5 has a first reflection face 513 and a second reflection face 514 to lead the incident light from the first lens LS1 to the second lens LS2. The first reflection face 513 is formed on the outer peripheral wall of a part curved from the upper vertical portion 51a to the left and right portions 51c of the light guide 51.

An inner interface of the outer peripheral wall totally reflects the illumination light from the first lens LS1, and serves as the first reflection face 513. The second reflection face 514 is formed on the outer peripheral wall of the part curved from the left and right portions of the light guiding unit 51 to the lower vertical portion 51b. That is, an inner interface of the outer peripheral wall further totally reflects the illumination light totally reflected by the first reflection face 513 to the second lens LS2, and serves as the second reflection face 514. The illumination light totally reflected by the second reflection face 514 is output from the second lens LS2.

The plurality of first lenses LS1, the light guiding unit 51, and the plurality of second lenses LS2 are integrally formed by the transparent medium such as resin and glass having optical permeability with respect to the illumination light. Accordingly, the illumination light input to the first lens LS1 travels in the transparent medium from the first lens LS1 to the second lens LS2 through the first reflection film 513 and the second reflection film 514. As a result, the illumination light passing through the lens array 5 is output from the second lens LS2, and then forms an image at magnification of erection equal-magnification.

As described above, in Embodiment 2, the light from the original document object OB (object) is input to the first lens LS1, is reflected by the first and second reflection faces 513 and 514 of the light guiding unit 51 to change the proceeding direction, and then is output from the second lens LS2. The first lens LS1, the light guiding unit 51, and the second lens LS2 are integrally formed by the transparent medium, the light input to the first lens LS1 travels in the transparent medium from the first lens LS1 to the second lens LS2 through the first and second reflection faces 513 and 514. That is, in the embodiment, no air is interposed among the first lens LS1, the first reflection face 513, the second reflection face 514, and the second lens LS2. As a result, it is possible to improve efficiency of using the light.

In Embodiment 2, each of the first reflection face 513 and the second reflection face 514 is a total reflection face reflecting the light. Accordingly, on the reflection faces 513 and 514, it is possible to reflect the light while preventing loss of light quantity, and it is possible further improve the efficiency of using the light.

In Embodiment 2, the first lens LS1, the first reflection face 513, the second reflection face 514, and the second lens LS2 are integrally formed, the relative positional relationship is determined with high precision, and there is an effect of improving performance of forming an image of the image forming optical element configured by them.

Similarly to FIG. 3 described in Embodiment 1, various variations may be employed for the shapes of the first lens LS1, the second lens LS2, the first reflection face 513, and the second reflection face 514.

Figure 14:
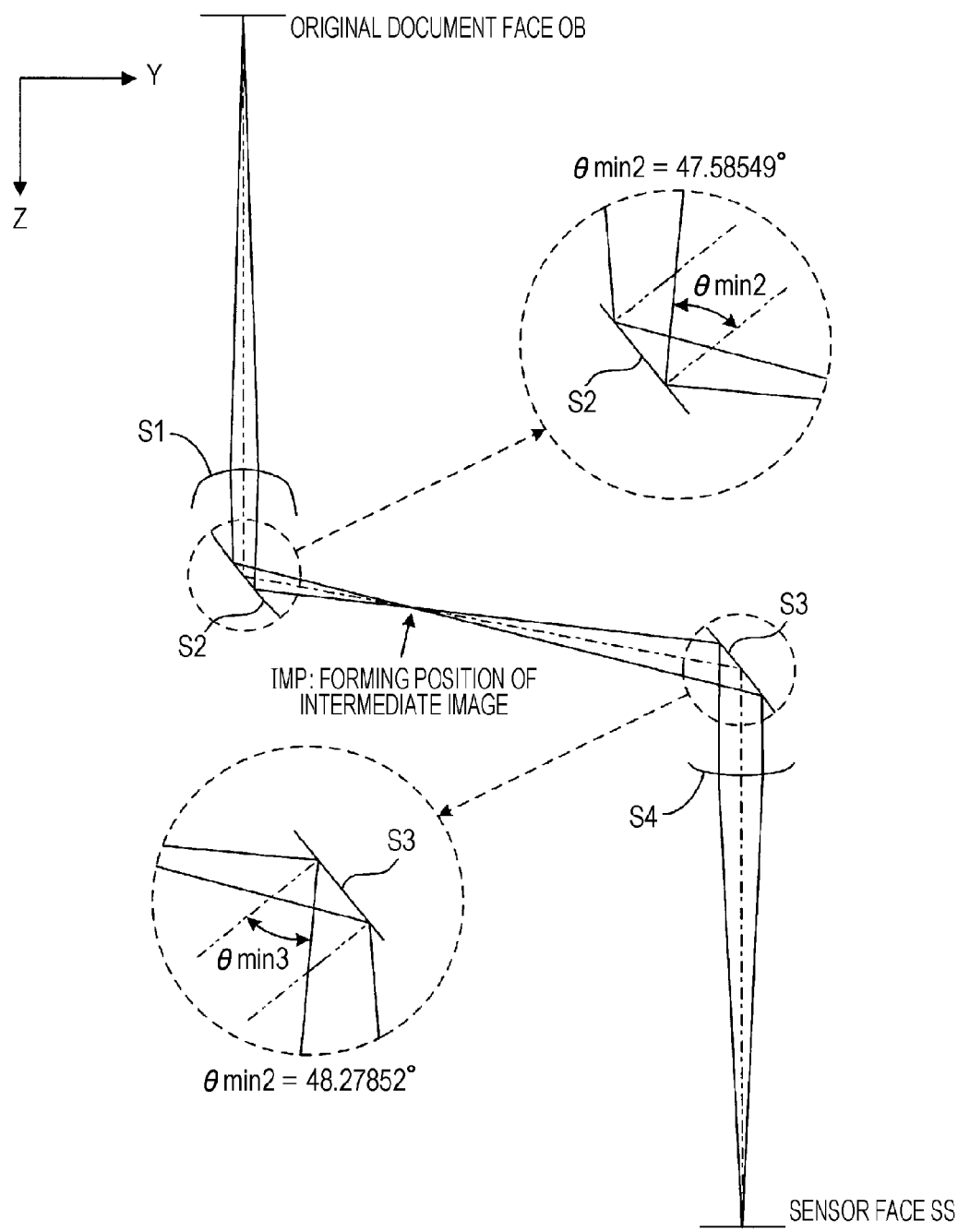
FIG. 14 is a light beam diagram of an optical system exemplified in variation 2 in Embodiment 2.

A specific configuration of the optical system exemplified in variation 2 in FIG. 3 will be described. FIG. 14 is a light beam diagram of the optical system exemplifying variation 2 in Embodiment 2. In FIG. 14, a partial enlarged diagram is shown in a broken line circle portion. The configuration of the optical system exemplified in variation 2 is the same as FIG. 5. In FIG. 5 and FIG. 14, a reference sign S1 is attached to the lens face of the first lens LS1, a reference sign S2 is attached to the first reflection film 513, a reference sign S3 is attached to the second reflection film 514, and a reference sign S4 is attached to the lens face of the second lens LS2. The definition formula of the face shape of the free curved face (xy polynomial express face) is the same as FIG. 6, and the definition formula of the face shape of the aspheric face (rotation symmetric aspheric face) is the same as FIG. 7.

FIG. 15 is a diagram illustrating a table of a coefficient providing an aspheric face shape of the lens face of the first lens. FIG. 16 is a diagram illustrating a table of a coefficient providing a free curved shape of the first reflection face. FIG. 17 is a diagram illustrating a table of a coefficient providing a free curved shape of the second reflection face. FIG. 18 is a diagram illustrating a table of a coefficient providing an aspheric face shape of the lens face of the second reflection face.

As shown in FIG. 14, the light from the original document OB is input to the left face S1 of the first lens L1, travels in the Z direction, is reflected by the first reflection face S2 to change the proceeding direction to the Y direction, and goes toward the second reflection face S3. Light having a width is input to the first reflection face S2, but the following formula is satisfied with respect to the light beam input at the minimum incident angle) $\theta min2$ $(=47.58549°)$ of the light beams constituting the light.

$$n \times \sin(\theta min2) > 1 \qquad \text{(Formula 1)}$$

Herein, $n(=1.531)$ is a refractive index of the transparent medium constituting the lens array 5. Accordingly, the light input to the first reflection face S2 is totally reflected. An intermediate image is formed at a position IMP between the first reflection face S2 and the second reflection face S3 by operations of the lens face S1 having the aspheric face shape and the first reflection face S2 having the free curved face shape.

The light from the intermediate image travels in the Y direction, then is further reflected by the second reflection face S3 to change the proceeding direction to the Z direction, and goes toward the lens face S4 of the second lens LS2. Light having a width is input to the second reflection face S3, but the following formula is satisfied with respect to the light beam input at the minimum incident angle $\theta min3$ $(=48.27852°)$ of the light beams constituting the light.

$$n \times \sin(\theta min3) > 1 \qquad \text{(Formula 2)}$$

Accordingly, the light input to the second reflection face S3 is totally reflected. In such a manner, the light reflected by the second reflection face S3 travels in the Z direction to pass the lens surface S4, and passes through the sensor face SS of the optical sensor 7, to form an image.

As described above, the optical system shown in FIG. 14 to FIG. 18 changes the proceeding direction of the light by two reflection films S2 and S3, that is, changes the direction of the optical axis (in FIG. 14, the optical axis is represented by a chain line). The optical system forms the intermediate image formed on the optical faces S1 and S2, on the optical faces S3 and S4, to form erection equal-magnification. The optical faces S1 to S4 are integrally formed by the transparent medium, to improve the efficiency of using the light.

As described above, in Embodiment 2, the optical system formed of the first lens LS1, the first reflection face 513, the second reflection face 514, and the second lens LS2 corresponds to "image forming optical element", the lens array 5 in which the plurality of image forming optical elements are arranged corresponds to "lens array", and the CIS module 1 corresponds to "image reading device".

The invention is not limited to Embodiment 1 and Embodiment 2, and may be variously modified in the description within the scope which does not deviate from the concept. For example, the lens array 5 is disposed to get into the lower portion of the light source unit 3 from the left side of the light source unit 3 to the right side in the Y direction. However, the lens array 5 may be disposed in the reverse direction (toward the left side of the Y direction from the light source unit 3) so as not to overlap the light source unit 3 in the up and down direction.

Variations of the shapes of the first lens LS1, the second lens LS2, the first reflection film 511, the second reflection film 512, the first reflection face 513, and the second reflection face 514 are not limited to the examples shown in FIG. 3. For example, one shape of the first reflection film 511, the second reflection film 512 (S2 and S3), the first reflection face 513, and the second reflection face 514 (S2 and S3) may be a plane, and the other may be a curved face.

In Embodiment 1, as a method of forming the first reflection film 511 and the second reflection film 512, a method other than the metal evaporation described above may be appropriately employed.

In Embodiment 1, in the first curve portion CV1 and the second curve portion CV2, the light guiding unit 51 is perpendicularly bent. However, the angle of bending the light guiding unit 51 with the first curve portion CV1 and the second curve portion CV2 is not limited to the perpendicular angle.

What is claimed is:

1. An image forming optical element, wherein a first lens to which light is input from an object, a second lens that outputs light, and a light guiding unit that leads the light input from the first lens to the second lens are integrally formed by a transparent medium,
    wherein the light guiding unit has a curved shape of a first curve portion and a second curve portion from the first lens to the second lens,
    wherein the first curve portion is provide with a first reflection face that reflects the light input from the first lens, to the second curve portion,
    wherein the second curve portion is provide with a second reflection face that reflects the light reflected by the first reflection face, to the second lens, and
    wherein the light input to the first lens travels in the transparent medium from the first lens to the second lens through the first reflection face and the second reflection face, and forms an image at magnification of erection equal-magnification after the outputting from the second lens.

2. The image forming optical element according to claim 1, wherein a first reflection film that reflects the light input from the first lens, to the second curve portion, is formed on an outer peripheral face of the first curve portion, and
    wherein a second reflection film that reflects the light reflected by the first reflection film, to the second lens, is formed on an outer peripheral face of the second curve portion.

3. The image forming optical element according to claim 2, wherein at least one of the first reflection film and the second reflection film has a plane shape.

4. The image forming optical element according to claim 2, wherein at least one of the first reflection film and the second reflection film has a curved face shape.

5. The image forming optical element according to claim 2, wherein the first reflection film is a metal film evaporated on the outer peripheral face of the first curve portion, and the second reflection film is a metal film evaporated on the outer peripheral face of the second curve portion.

6. An image forming optical array, wherein a plurality of the image forming optical elements according to claim 2 are integrally arranged.

7. An image reading device comprising:
    a light source unit that irradiates an object with light;
    the image forming optical element according to claim 2; and
    a reading unit that reads an erection equal-magnification image of the object formed by the image forming optical element.

8. The image forming optical element according to claim 1, wherein each of the first reflection face and the second reflection face is a total reflection face that totally reflects light.

9. The image forming optical element according to claim 8, wherein each of the first reflection face and the second reflection face is a total reflection face formed on an inner interface of the light guiding unit.

10. The image forming optical element according to claim 8, wherein at least one of the first reflection face and the second reflection face has a plane shape.

11. The image forming optical element according to claim 8, wherein at least one of the first reflection face and the second reflection face has a curved face shape.

12. An image forming optical array, wherein a plurality of the image forming optical elements according to claim 8 are integrally arranged.

13. An image reading device comprising:
    a light source unit that irradiates an object with light;
    the image forming optical element according to claim 8; and
    a reading unit that reads an erection equal-magnification image of the object formed by the image forming optical element.

* * * * *